US006934367B1

United States Patent
LaPierre et al.

(10) Patent No.: US 6,934,367 B1
(45) Date of Patent: Aug. 23, 2005

(54) SYSTEM AND METHOD FOR VOICEMAIL MESSAGE CERTIFICATION AND REPLY USING A TEMPORARY VOICEMAIL SERVICE

(75) Inventors: Stephen R. LaPierre, Union City, GA (US); Joseph M. Knoerle, Atlanta, GA (US); Vernon Meadows, Lilburn, GA (US); David A. Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 380 days.

(21) Appl. No.: 09/894,317

(22) Filed: Jun. 28, 2001

(51) Int. Cl.[7] .................................................. H04M 1/64
(52) U.S. Cl. .............................. 379/88.12; 379/88.13; 379/88.22
(58) Field of Search ............................ 379/67.1, 88.13, 379/88.14, 88.16, 88.22–88.25, 207.02, 220.01, 219, 68, 88.17, 201.01, 201.02, 201.03, 201.12; 348/14.014; 705/14

(56) References Cited

U.S. PATENT DOCUMENTS

| | | | |
|---|---|---|---|
| 5,155,761 A | 10/1992 | Hammond | |
| 5,406,616 A | 4/1995 | Bjorndahl | |
| 5,544,229 A * | 8/1996 | Creswell et al. ....... | 379/114.05 |
| 5,784,438 A | 7/1998 | Martinez | |
| 5,793,771 A | 8/1998 | Darland et al. | |
| 6,014,427 A * | 1/2000 | Hanson et al. .......... | 379/88.18 |
| 6,014,429 A * | 1/2000 | LaPorta et al. ......... | 379/88.15 |
| 6,032,039 A | 2/2000 | Kaplan | |
| 6,173,047 B1 | 1/2001 | Malik | |
| 6,175,859 B1 | 1/2001 | Mohler | |
| 6,233,318 B1 * | 5/2001 | Picard et al. ............ | 379/88.17 |
| 6,285,745 B1 * | 9/2001 | Bartholomew et al. .. | 379/88.17 |
| 6,459,913 B2 * | 10/2002 | Cloutier ................. | 379/211.01 |
| 6,502,077 B1 * | 12/2002 | Speicher ...................... | 705/14 |

OTHER PUBLICATIONS

G. Vaundreuil, G. Parsons, "Voice Profile for Internet Mail," RFC2421, The Internet Society (Sep. 1998) pp. 1–39.
Arthur Rosenberg, David Zimmer, "IP Infrastructure: The Fastest Track for Tomorrow's Unified Communications," The Unified View Report (Oct. 2000) pp. 1–16, Warrington, PA, Atlantic Regional Office.
"Computerized Call Return Feature," IBM Technical Disclosure Bulletin (Apr. 1986) pp. 4897–4901.
"BellSouth Memory Call Voicemail Services," BellSouth (1999) pp. 1–3.
"Products—Impact Voice Mail Server Deluxe," Black Ice Software Inc. (1997) pp. 1–5.
R. Fajman, "An Extensible Message Format for Message Disposition Notifications," RFC2298, The Internet Society (Mar. 1998) pp. 1–21.

* cited by examiner

Primary Examiner—Fan Tsang
Assistant Examiner—Ovidio Escalante
(74) Attorney, Agent, or Firm—Cantor Colburn LLP

(57) ABSTRACT

This invention is directed to a system and method for providing a status certification for a voicemail message in a telecommunications network. An embodiment of this invention comprises a voicemail system, which provides a caller in a telecommunications network with the option of certifying a voicemail message when the recording of the message is complete. By certifying the voicemail message, the caller is directing the voicemail system to create a temporary voicemail box and to track any actions related to the message that message that occur within the voicemail system. As changes occur, the voicemail system creates one or more status messages in the temporary voicemail box. If the recipient replies to the messages, the voicemail system also stores the reply in the temporary voicemail box. When a caller subsequently accesses the temporary voicemail box, the caller can access the messages and can also reply to any of the messages. The voicemail system stores the caller's reply in the original recipient's voicemail box.

52 Claims, 5 Drawing Sheets

SYSTEM AND METHOD FOR VOICEMAIL MESSAGE CERTIFICATION AND REPLY USING A TEMPORARY VOICEMAIL SERVICE

CROSS-REFERENCE TO RELATED APPLICATION

This application relates to U.S. patent application Ser. No. 09/894,542, filed simultaneously, entitled "System and Method for Electronic Message Status Certification," which is incorporated herein by reference. This application relates to U.S. patent application Ser. No. 09/894,286, filed simultaneously, entitled "System and Method for Electronic Messages Status Notification," which is incorporated herein by reference. This application relates to U.S. patent application Ser. No. 09/894,498, filed simultaneously, entitled "System and Method for Electronic Message Status Notification and Reply Using Various Electronic Media," which is incorporated herein by reference. This application relates to U.S. patent application Ser. No. 09/894,494, filed simultaneously, entitled "System and Method for Electronic Message Reply Option Selection Notification," which is incorporated herein by reference.

FIELD OF THE INVENTION

This invention generally relates to the field of telecommunications. This invention more particularly relates to the establishment of a guest voicemail box to enable monitoring the status of a voicemail message.

BACKGROUND

1. Overview

Electronic messaging services have become critical to the efficient operation of business. These services have also become an indispensable tool for many individuals. As the importance of electronic messaging services has grown, so has the importance of providing these services in a reliable, robust and cost-effective manner. The markets in which the service providers provide these services have also become highly competitive, and this competitive environment exerts additional pressure on the service providers to continually improve electronic messaging services. Service providers see erosion in their existing subscriber base as competitive service providers continue to make it easier and attractive to migrate to their service offerings. An inability to change service offerings to keep pace with functional requirements causes additional erosion. In order to compete effectively and increase subscriber base, a service provider must endeavor to provide the highest possible level of sought-after services while simultaneously delivering those services at a reasonable price.

Electronic messaging service providers currently provide a plurality of specialized value-added services to both business and individual users. Although the earliest true electronic messaging can be traced back to 1844 and the advent of the first practical electric telegraph system; electronic messaging now principally includes messaging via e-mail, facsimile, interactive paging and voice communications systems, both wires and wireless. However, electronic messaging is by no means limited to these mediums. For example, various video mail solutions are becoming widely available. For example, Pacific Image Communications offers a home or small-office/home-office (SOHO) product, Super Voice® Videomail, that allows the attachment of a video and audio message to a standard e-mail message. (Super Voice® is a registered trademark of Pacific Image Communications, Inc.)

Also, videophones and video conferencing are now ubiquitous in large businesses. High-speed data lines, which were until recently limited to high-cost dedicated lines, have migrated to the home in the form of digital subscriber lines (xDSL) and cable-modems. This increase in available bandwidth enables a higher level of electronic messaging service content in the home, and in combination with readily available video communications equipment will expand the demand for video-based messaging services in the home as well.

Electronic messaging services beyond the basic sending, receiving and storing of messages differ somewhat depending on the medium in which the message is being transmitted. These services include, but are most certainly not limited to, message forwarding, automatic messages replies and message blocking. Despite a proliferation of available messaging services, some basic services are still lacking: 1) a robust and flexible means to determine the disposition of an electronic message once it has been received by a recipient's messaging system; and 2) a simple means of maintaining a dialog with the recipient via the recipient's messaging system subsequent to the initial creation and dispatching of a message. Also, although various media types have been integrated successfully within various messaging systems, a recipient has no level of assurance that the originator can receive a reply to the message.

II. Message Disposition

Most widely available e-mail systems adhere to Internet standards as set forth in the Requests for Comment (RFC). Generally, those systems that do not specifically adhere to the Internet standards, such as those systems which adhere to the International Telecommunications Union (ITU-T) X.400 standards, provide interfaces, which in turn provide Internet standards compatibility. Adherence to the Internet standards includes providing a means of status notification to the sender in the form of a message disposition notification (MDN). As those skilled in the art are sure to recognize, disposition in this sense is not limited to a final action taken on a message but rather includes any action directed to the message after successful delivery. Although e-mail systems adhering to the standards to provide DMN, the provision is subject to a variety of limitations. RFC 2298, the draft standard for MDN, defines a Multipurpose Internet Mail Extension (MIME) content-type that a messaging system uses to report the disposition of a message after successful delivery. The standard defines disposition events types, which include, but are not limited to, displayed, dispatched, deleted, denied and mailbox-terminated events. Dispatch of a message means to send the message to a destination; dispatch includes forwarding, replying and any other act, which would result in sending the message to a destination. When any of the disposition events occurs, an e-mail system adhering to the standard sends a disposition notification message to a mailbox specified by the original sender in the header of the original message.

Voicemail services and systems function within telecommunications networks, and modern telecommunications networks adhere to a common set of industry-specific standards. However, the actual feature sets included in voicemail and other value-added services are not the subject of these standards. Instead, the service providers and their suppliers are responsible for determining the feature set that they include in a particular service. The provision of status notification in voicemail services is even more limited than in e-mail systems. One exemplary voicemail service is the BellSouth® MemoryCall® service. MemoryCell® provides status notification in the from of a confirmation that a message has been accessed. When the recipient of the voicemail message accesses the message, a confirmation message is created and stored in the voicemail box of the originating caller. The Originating caller must be an existing subscriber to the MemoryCell® service, i.e., the voicemail box must be preexisting. (BellSouth® is a registered trademark of BellSouth Intellectual Property Corporation. MemoryCall® is a registered service mark of BellSouth Corporation.)

E-mail and voicemail systems are subject to a number of limitations in the provision of message disposition notification. First, in an e-mail messaging system adhering to RFC 2298, the recipient of the disposition notification must be identified as an attribute in the header of the original message (Disposition-Notification-To). The attribute must specify a valid mailbox to which a disposition is subsequently sent. The mailbox refers to another e-mail address; the sender cannot specify varying mediums within which to reply. Also, as stated above, to utilize voicemail confirmation in the MemoryCall® service, the caller must also be an existing subscriber of the service, i.e., the caller must have a predefined relationship with the voicemail system. Since the telecommunication service provider generally provides this type of service, this requirement limits the availability of this feature to those callers living or working within in a specific region, or perhaps, even within a specific community. Once again, the recipient cannot specify an alternate medium within which to send the confirmation.

Another limitation of current electronic messaging systems is that they identify a message in a disposition notification or confirmation only by attributes of the message such as the recipient, the data created and perhaps a portion of the message. It can be quite difficult for a sender or caller to associate the disposition notification with the correct message. For instance, if a sender or caller using one of these services sends a particular recipient multiple messages on the same day, it is very difficult for the sender to determine to which message the disposition notification applies.

Some of the limitations on disposition notification apply primarily to a specific medium. For example, a limitation of current e-mail systems is that a disposition notification message must be sent for each disposition of the message. Depending on the requirements of the sender, many of the disposition messages provided will be at least valueless and at worst distracting and irritating.

A limitation peculiar to voicemail systems is the inability to monitor a range of disposition event types when the recipient accesses the message. A caller may wish to known whether or not the recipient deleted a message without listening to it, forwarded the message to another party, or if the recipient was deleted from the voicemail system without ever having accessed the message. This information is unavailable in current voicemail services.

III. Dialog

Voicemail systems allow a recipient of a message to respond to the message by various means. If the original caller is a subscriber to the same voicemail service as the recipient, the recipient may have the option of responding directly to the message in the form of a voicemail message, which is then stored in the original caller's voicemail. The recipient also may have the option to automatically place a direct call to the original caller either utilizing the voicemail service or by using an additional service, such as caller-ID.

Although the recipient of a voicemail message generally has the means to respond to a message, the ability to respond and maintain a dialog via voicemail is limited. In current voicemail systems, the subscriber may reply in the form of a voicemail message to the original caller only if the original caller is also a subscriber to the voicemail service. If the original caller is not a subscriber, the recipient may be able to place a direct call utilizing a service, such as caller-ID, and leave a voicemail message. However, the voicemail service itself is not facilitating the dialog; the dialog depends on the existence of at least two additional services: caller-ID and the original caller's voicemail service.

SUMMARY OF THE INVENTION

This invention is directed to a system and method for providing a status certification for a message in a telecommunications network using a temporary voicemail box. An embodiment includes a voicemail system, which provides a caller in a telecommunications network with the option of certifying a voicemail message when the recording of the message is complete. By certifying the voicemail message, the caller is indicating that the voicemail system should track any actions related to the message that occur within the voicemail system. In order to track these changes, the voicemail system stores message identifiers, which may be used to identify the message and to indicate that the message requires certification, and disposition identifiers, which may be used to track disposition events described below. The voicemail system also creates a temporary voicemail box. The temporary voicemail box stores the status notification and any additional communication directed to the originator of the voicemail message, such as a reply from the recipient. The voicemail system provides the caller with a means of accessing the temporary voicemail box during the process of leaving a message.

The actions taken relative to the message, herein referred to as disposition events, may be performed by the message recipient, by the voicemail system administrator or may result from an automatic event executed by the voicemail system. The actions may include, but are not limited to, accessing the message, deleting the message without listening to it, forwarding the message, and deleting the recipient from the voicemail system. When any of these actions occur, the system stores additional data elements, disposition identifiers, with the message. The status of a message at any point in time may be ascertained by compiling the message and disposition identifiers that the voicemail system has stored.

A triggering event is an event that triggers the compilation of message and disposition identifiers and storage of the resultant message in the temporary voicemail box. The message system administrator may specify that a certain disposition event is also a triggering event. The system administrator may also or instead specify the passage of a certain period of time as a triggering event.

A basic function of a voicemail service is the ability to reply to other subscribers of the same voicemail service. Once the system creates a temporary voicemail box, the temporary voicemail box functions as any other voicemail box within the voicemail system, and therefore, either party can respond to the other in the form of a voicemail message. For example, a caller leaves a message for a recipient and chooses status certification using a temporary voicemail box. The recipient replies to the message, and the system stores the reply in the temporary voicemail box. The original caller accesses the reply message in the temporary voicemail box and responds in kind. The second reply is stored in the recipient's voicemail box. The ability of both the recipient and the original caller to reply to the one another via voicemail messages constitutes a dialog. In general, a party conducts a dialog contemporaneously with the other party or parties to the dialog. By using a temporary voicemail box to store replies to the originator, this invention supports an asynchronous dialog as well. An asynchronous dialog is a dialog in which a first party does not respond immediately and directly to a second party, but rather creates a message that the second party later receives or retrieves. An asynchronous dialog does not require that the parties communicate contemporaneously.

An embodiment of this invention provides numerous advantages over current voicemail systems. First, the system allows the caller flexibility in accessing the temporary voicemail box; access to the original communication client used to certify the voicemail message is into required. Also, an embodiment of this invention eliminates the potential for sending the message to a third-party by mistake, which exists in current systems. Only the original caller and these to whom the original caller has given the access means can access the temporary voicemail box. Another advantage of an embodiment of this invention is that a separate message is not sent out for each disposition event. The system creates a status notification only upon the occurrence of triggering events, limiting the number of messages that the original caller must handle.

Also, current voicemail services simply store confirmation that a message was accessed in an existing subscriber's voicemail box. An embodiment of this invention allows subscribers and non-subscribers alike to access message status information. An embodiment of this invention also tracks multiple disposition events, providing the requestor with much more information than is available in current voicemail services.

Further details and advantages of this invention are set forth below.

BRIEF DESCRIPTION OF THE FIGURES

These and other features, aspects, and advantages of this invention are better understood when the following Detailed Description of the Invention is read with reference to the accompanying drawings, wherein.

DETAILED DESCRIPTION OF THE INVENTION

Figure 1:
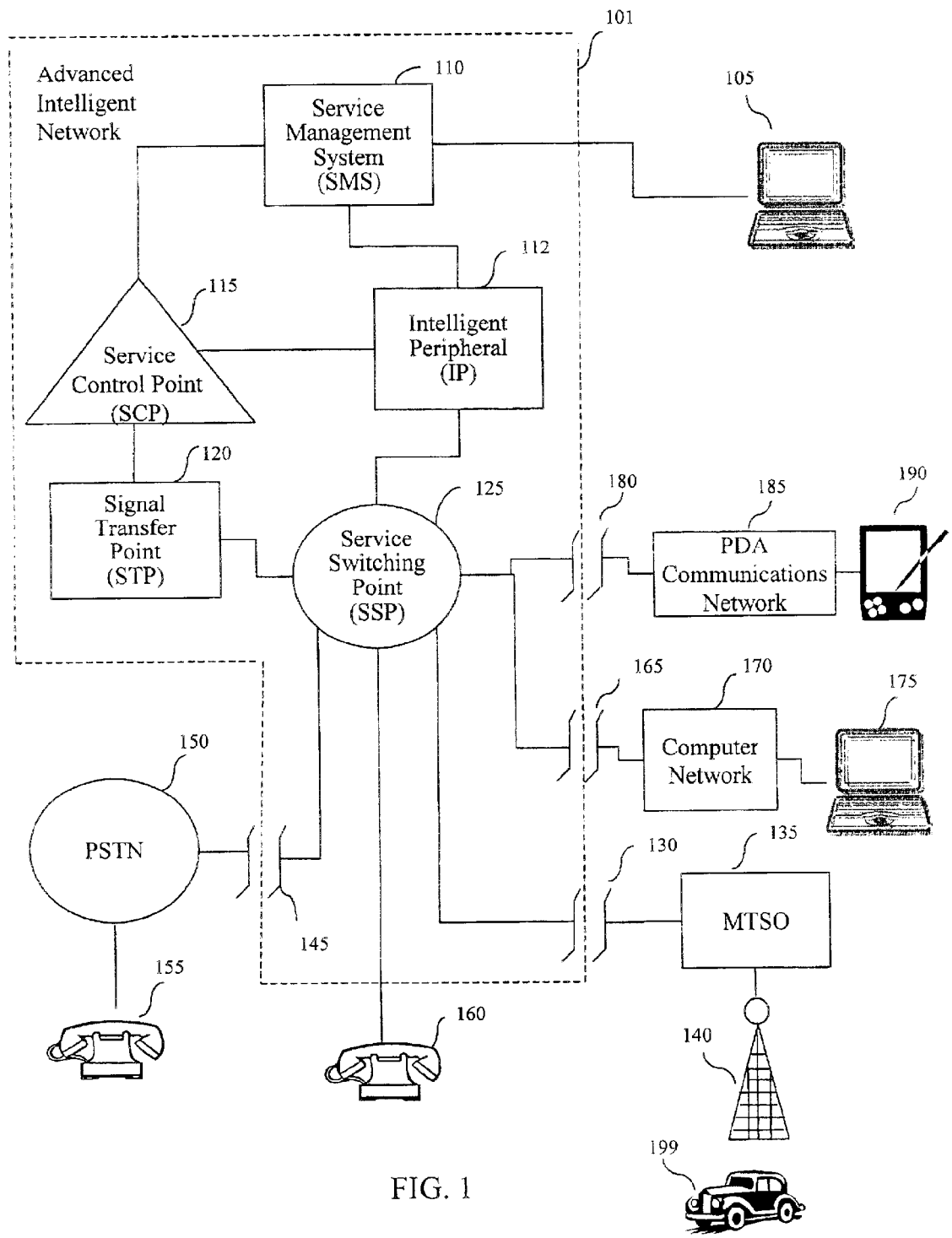
FIG. 1 is a diagram of an exemplary embodiment and an exemplary environment for operation of this invention.

As described above, this invention provides a system and method for providing a status certification for a message in a telecommunications network using a temporary voicemail box. An embodiment of this invention includes a processor to assign a message identifier for the message. The processor also creates a disposition identifier in response to a disposition event and associates the disposition identifier with the message. In response to a triggering event, the processor compiles the message and disposition identifiers to generate a status notification and stores the status notification in a temporary voicemail box. The system also uses the temporary voicemail box for storing at least one of a status notification and/or a reply.

The message system administrator specifies triggering events. Triggering events include both disposition events and the passage of a specified period of time. The system administrator may specify additional triggering events as well.

An embodiment of this invention also provides the recipient with the option of replying to the voicemail message. If the recipient does reply, the processor receives the reply, associates the reply with the message and stores the reply in the temporary voicemail box.

The temporary voicemail box functions as any other voicemail box, allowing the caller accessing the temporary voicemail to listen to and respond to messages stored in the temporary voicemail box. For example, when the recipient listens to a voicemail message, they may respond to the caller via a voicemail message. The status notification and reply are sorted in the temporary voicemail box. When the original caller accesses the messages in the temporary voicemail box, the caller may reply, resulting in the creation of an additional message in the original recipient's voicemail box.

An embodiment of this invention may also support an asynchronous dialog as described above. In one embodiment of this invention, an asynchronous dialog includes receiving a reply to an earlier reply, associating the later reply with the original message and storing the later reply. In another embodiment of this invention, an asynchronous dialog includes receiving a second voicemail message from the originator of a certified voicemail message, associating the second message with the first and storing the second message.

As described above, an embodiment of this invention creates disposition identifiers in response to disposition events. A disposition event includes at least one of: a managing event and/or a dispatching event. A managing event includes management of the message, the messaging system and the identifiers associated with the message. A managing event includes at least one of: accessing the message, deleting the message, presenting an indication of the message, expiring the message, terminating a recipient of the message from the communications network, denying the status certification for the message, and/or a malfunctioning of the status certification for the message. An indication of the message is anything that brings the message's presence in the messaging system to the attention of the recipient. The recipient may or may not act on the message when the recipient receives the indication. For example, a messaging system indicates that two messages exist, but that only one is urgent. If the recipient accesses only the urgent message, the recipient has received indication of both messages, but only accessed one. Expiring the message refers to the deleting or inactivating of a message after a designated period of time. A dispatching of the message is any act that causes the original message to be sent to an address, such as forwarding the message and/or replying to the message.

For a messaging system to successfully track messages as they move into and out of the system or between parties within the system, the system must associate identifying information with the messages. An embodiment of this invention associates message identifiers with a message to facilitate tracking of the message. Message identifiers are discreet data elements describing the message. The message identifiers distinctly identify an individual message and its contents and also identify information contained in the header of the message, such as the source and destination of the message, the communication network within or across which a message has traversed, the parties to the message, and the dates and times at which certain message related events occur. Message identifiers that describe the contents of the message include at least one of: a type identifier, an alphanumeric identifier, a capabilities identifier and/or an annotation. A type identifier includes information regarding the format of the message, such as text, rich text format (RTF) or HTML. An alphanumeric identifier is an identifier consisting of both alphabetic and numeric symbols. In an embodiment of this invention, the alphanumeric identifier is a unique code assigned to each message within the messaging system. A capabilities identifier describes the media capabilities required to successfully present the message. For example, if a message contains a video clip, a messaging client must include or have access to a video media player to successfully present the message to the recipient. An annotation allows the originator of a message to later identify the message. For example, a caller might record a brief audio annotation such as "lunch on May $1^{st}$" with a message to more easily identify the original message when the caller receives a subsequent status notification.

In an embodiment of this invention, message identifiers that describe the header information contained in the message include at least one of: a communication network identifier, a device identifier, a role identifier, a party identifier, a date identifier and/or a time identifier. A communications network identifier describes the type of network the message traversed as well as identifying various components of the network. For example, if a call originated in the public switched telephone network, the system would associated a dialing number with the message.

A device identifier describes the type of device used in a communication, identifies an actual device, and/or describes a device's capabilities with respect to voice, text and multimedia. In an embodiment of this invention as a voicemail system, when the message is left via an internet-capable cellular device, the system associates an identifier describing this capability with the message.

Identification of the parties to a communication is a critical requirement in any communications system, electronic or otherwise. A role identifier describes a role that a party plays in a communication, and a party identifier describes a party to the communication. Depending on the communication type, a party may participate in at least one of a number of roles, including, but certainly not limited to, originator, sender, caller, recipient, and/or system administrator. A party identifier, which identifies a party, includes at least one of: an email address, an access address, a voice sample, and an image. The applicable type of party identifier varies depending on the type of message and communications network. For example, in an embodiment of this invention as a voicemail system, a voice sample identifies a party to the message. An access address includes any address from which or to which message is directed. For example, in an embodiment of this invention as a voicemail system, a caller leaves a message in the system, and the system stores the caller's dialing number as the access address.

Date and time identifiers provide the capability to track when events occur. For example, data and time identifiers are associated with messages to indicate when the message is sent, received and/or dispatched. Date and time identifiers are also associated with other events, such as the disposition events that are described below, to indicate when these events occur.

Billing for services is a necessity for any communications service provider. An embodiment of this invention bills a party to the message for providing a status certification for a message. Various embodiments of billing are possible. One embodiment bills the originator for the message when the originator requests a status certification. Another embodiment bills the recipient a flat monthly charge for making the service available for communications directed to the recipient.

In an embodiment of this invention, the messaging system processor includes a central processing unit as well as read-only memory (ROM) and random access memory (RAM). The system stores the attributes for the certification in the processor's RAM. Storing the attributes in this manner ensures fast retrieval times. The attributes include at least one of the message identifier, the disposition identifier, the reply and the status notification. An alternative embodiment of this invention includes a data repository to store the attributes. The data repository provides somewhat slower data access but improves stability and recoverability of the system. In one embodiment of this invention, the data repository includes a single database. In another embodiment, the system includes multiple databases, a first database for storing the message, and a second for storing the attributes associated with the message.

An embodiment of this invention also provides administrative functions, including, but not limited to, deleting, monitoring, moving, forwarding, securing, archiving and backing up the attributes. These functions allow the administrator to effectively manage the resource requirements on the message system relative to the status certification requests. An embodiment of this invention also provides administrative functionality to the recipient of a message, including informing a recipient of an attribute or a message and blocking an attribute of a message.

As illustrated in FIG. 1, this invention is advantageously embodied as a system in an advanced intelligent network (AIN) 101, which provides advanced services such as voicemail. As is known to those skilled in the art, an AIN includes a plurality of hardware and software elements operating over industry standard communication protocols, including signaling system 7 (SS7). For the sake of brevity, only a basic description of the AIN is provided herein. For further information regarding aspects of the AIN, refer to Weisser, U.S. Pat. No. 5,430,719, which is incorporated herein by reference.

In an embodiment of this invention, the status certification functionality of this invention is implemented via an intelligent peripheral (IP) 112. An intelligent peripheral executes service logic programs or other similar software to provide advanced services in an AIN. An intelligent peripheral also includes a dual-tone multi-frequency (DTMF) and voice recognition as well as voice synthesis capabilities.

A call is placed on a telephone 160 that is functionally connected to a service switching point (SSP) 125. An SSP is a central office switch that provides intelligent network functionality. Once the SSP collects the dialed digits, the SSP generates a trigger. A trigger generates a packet that is sent to a service control point (SCP) 115 through a signal transfer point (STP) 120, causing the SCP to query its database to determine whether to provide conventional telephone service or an enhanced service for the call. Signal transfer points are packet switching systems that can route and concentrate messages exchanged between service control points and service switching points. A service control point includes computer processors, application software and database that control the setup, monitoring and termination of phone calls.

The SSP pauses as the trigger is routed through the STP 120 the SCP 115. The SCP 115 looks up the record for the dialed number and determines that the calling line is busy and that the subscriber is also a subscriber to a voicemail service. The SCP sends packets back to the SSP via the STP 120. The SSP 125 establishes a voice and data link to the IP 112. The IP accepts the voicemail message and provides the caller with audio instructions regarding establishing a status certification. The IP receives the status certification information from the caller via DTMF recognition or voice recognition and stores the information, message and status identifiers, in a database in the IP. The IP creates a temporary voicemail box in which to store the status notification and reply. The IP also provides the caller with various means of later accessing the temporary voicemail box. The caller terminates the call and the system releases all data and voice resources.

As is clear to one skilled in the art, multiple embodiments of this invention are possible. This invention may be embodied as a system in an advanced intelligent network (AIN), as a system including no AIN components or as a system which combines aspects both inside an outside an AIN. For example, the forwarding of a call to an intelligent peripheral may be a purely switch-based "call forward no answer" or "call forward busy."

As is clear to one skilled in the art, a variety of methods are available for creating a temporary voicemail box. For an example of another method of creating a temporary voicemail box, refer to Malik, U.S. Pat. No. 6,173,047, which is incorporated herein by reference.

When the message recipient listens to the voicemail message, the IP 112 stores a disposition identifier with the message. As additional disposition events occur, the IP associates additional disposition identifiers with the message. When a triggering event occurs, the IP compiles the message and disposition identifiers to create a status notification and stores the status notification in the temporary voicemail box. The IP also receives a reply from the recipient of the message and stores the reply in the temporary voicemail box as well.

In an embodiment of this invention, the SSP 125 receives the communication directed to the temporary voicemail box. In response to the communication, the SSP pauses in processing the call and issues a query to the SCP 115 via the STP 120, requesting instructions regarding the handling of the communication, and the SCP directs the SSP to establish a link to the IP. Once this link is established, the IP may send a conversion message to the SSP, instructing the SSP to play announcement requiring the requestor to identify the temporary voicemail box or to identify the message to which the identifiers have been associated. Alternatively, the IP may be able to identify the temporary voicemail box and message based on an attribute associated with the requestor, such as the dialing number from which the request originated. The IP provides voicemail functionality to the caller, including listening to the message, deleting the message and replying to the message.

SSP 125 also provides an interface between the AIN and termination points, such as an interface 130, 145, 165, 180. An interface, such as a router, gateway or other similar device, acts as a protocol converter between disparate networks.

The system provides access to the temporary voicemail box via a network access device (NAD) 135, 160, 175, 190, 199. The NAD is functionally connected to the SSP 125 and is operative both to facilitate the voicemail functionality and to render the status notification and reply. The status notification may take at least one of many forms, depending on the capabilities of the NAD. The NAD includes at least one of: a telephone 160, 135, a cellular-capable device 199, a personal digital assistant (PDA) 190 and/or a computer 175. The NAD may be connected directly to the SSP or may exist in a network, which is connected to the SSP via one or more of the afore mentioned interfaces.

In an embodiment of this invention, a mobile telephone switching office (MTSO) 135 is functionally connected to an interface 130, which is functionally connected to the SSP 125. The MTSO facilitates access of a cellular-capable device 199 to the AIN 101 and to the status notification and reply stored in the temporary voicemail box. Another embodiment of this invention also includes a computer network 170, which is functionally connected to an interface 165 and provides direct link or common web-based access to the AIN as well as to the status notification and reply stored in the temporary voicemail box via a computer network client device 175. As is obvious to one skilled in the art, various other interfaces, external networks, such as the public switched telephone network 150, and access devices, such as a personal digital assistant 190, provide access to the AIN.

An embodiment of this invention also includes administrative functionality. The administrative functionality is necessary for the convenience of the recipient and for the efficient management of the AIN 101. In an embodiment of this invention, the IP 112 is further operative to delete the identifiers, based on actions by the recipient, by the system administrator, or automatically based on variables such as the passage of time. An embodiment also includes functionality for the recipient of a voicemail message to provide flexibility and privacy in the recipient's use of the voicemail service. The IP is further operative to inform a recipient of a request for status certification. Also, the IP is operative to allow a recipient to block a status certification on a particular message or to block status certification on all messages directed to the recipient.

An embodiment of this invention also includes further administrative functionality implemented through the use of another AIN element, a service management system (SMS). A SMS is an element designed to provide management and reporting capabilities to an AIN, such as managing software, service data and subscriber data updates and generating subscriber service reports. Referring again to FIG. 1, SMS 110 is functionally connected to IP 112 and SCP 115 and is operative to monitor the identifiers. The monitoring functionality includes a subscriber service reports and broader system management reports as identified by an administrator of the system. A terminal 105 provides access to present a graphical user interface to a system administrator or other user with access to the AIN. The graphical user interface provides administrative functionality, such as displaying the identifier monitoring reports.

Figure 2:
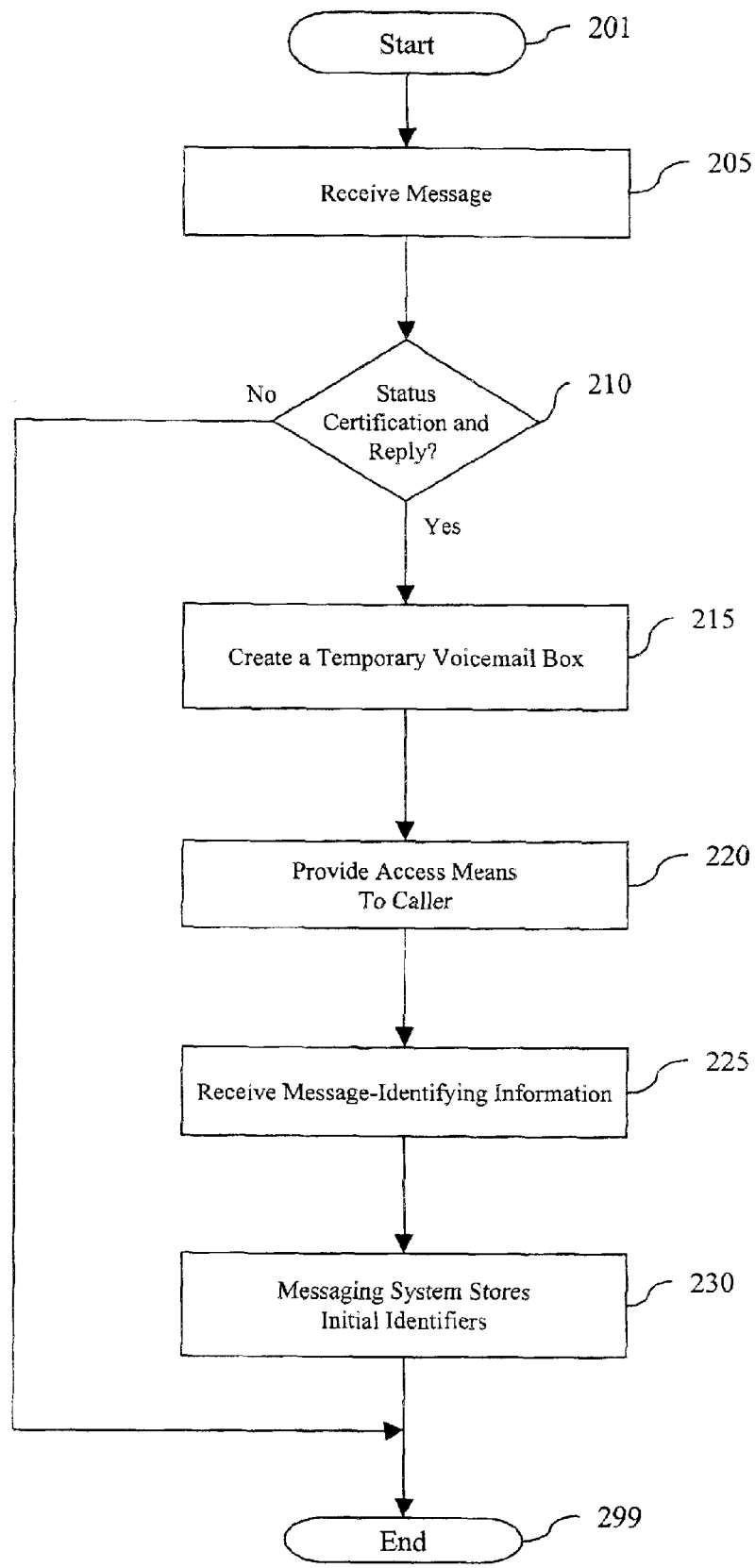
FIG. 2 is a flowchart illustrating an exemplary method for certifying a message in an embodiment of this invention.
Figure 3:
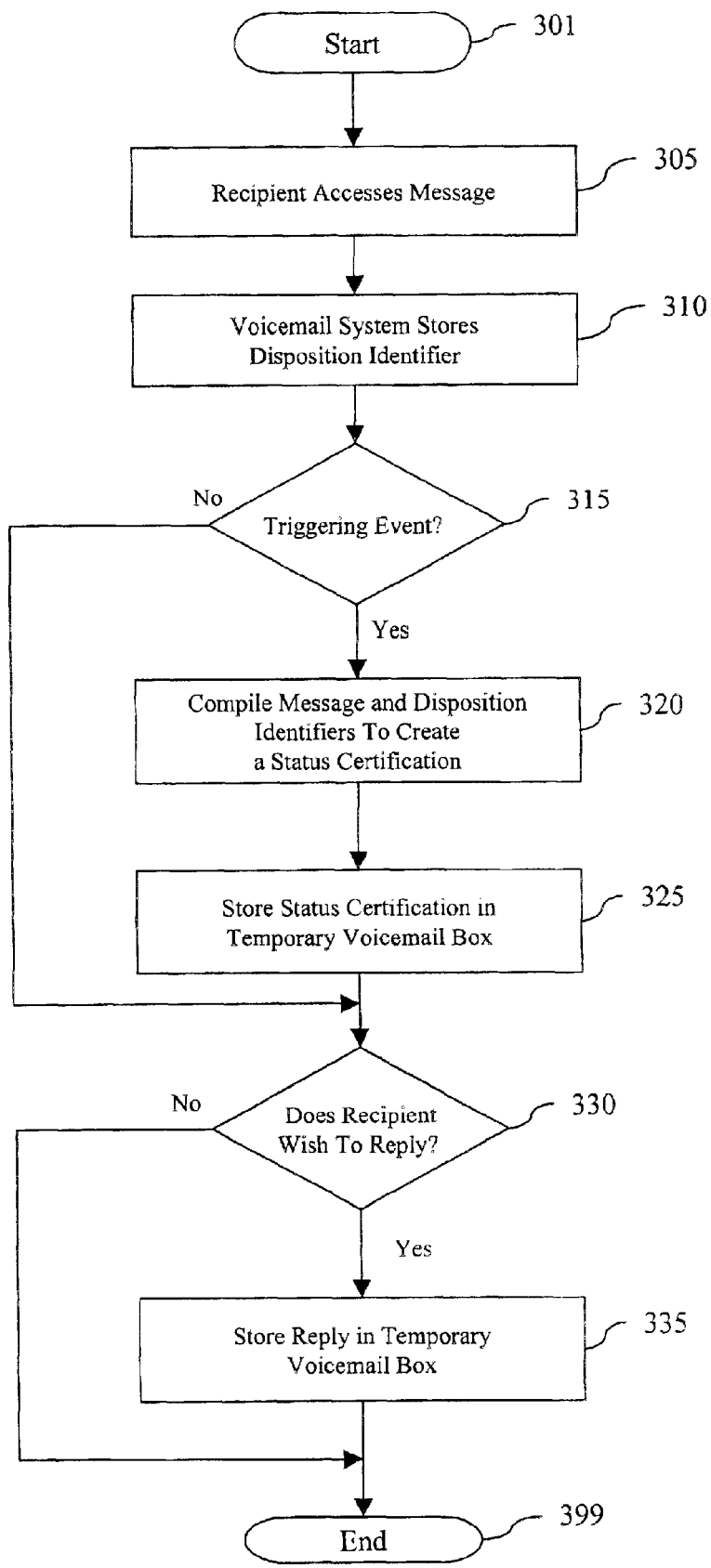
FIG. 3 is a flowchart illustrating an exemplary method for associating identifiers with and replying to a message in an embodiment of this invention.
Figure 4:
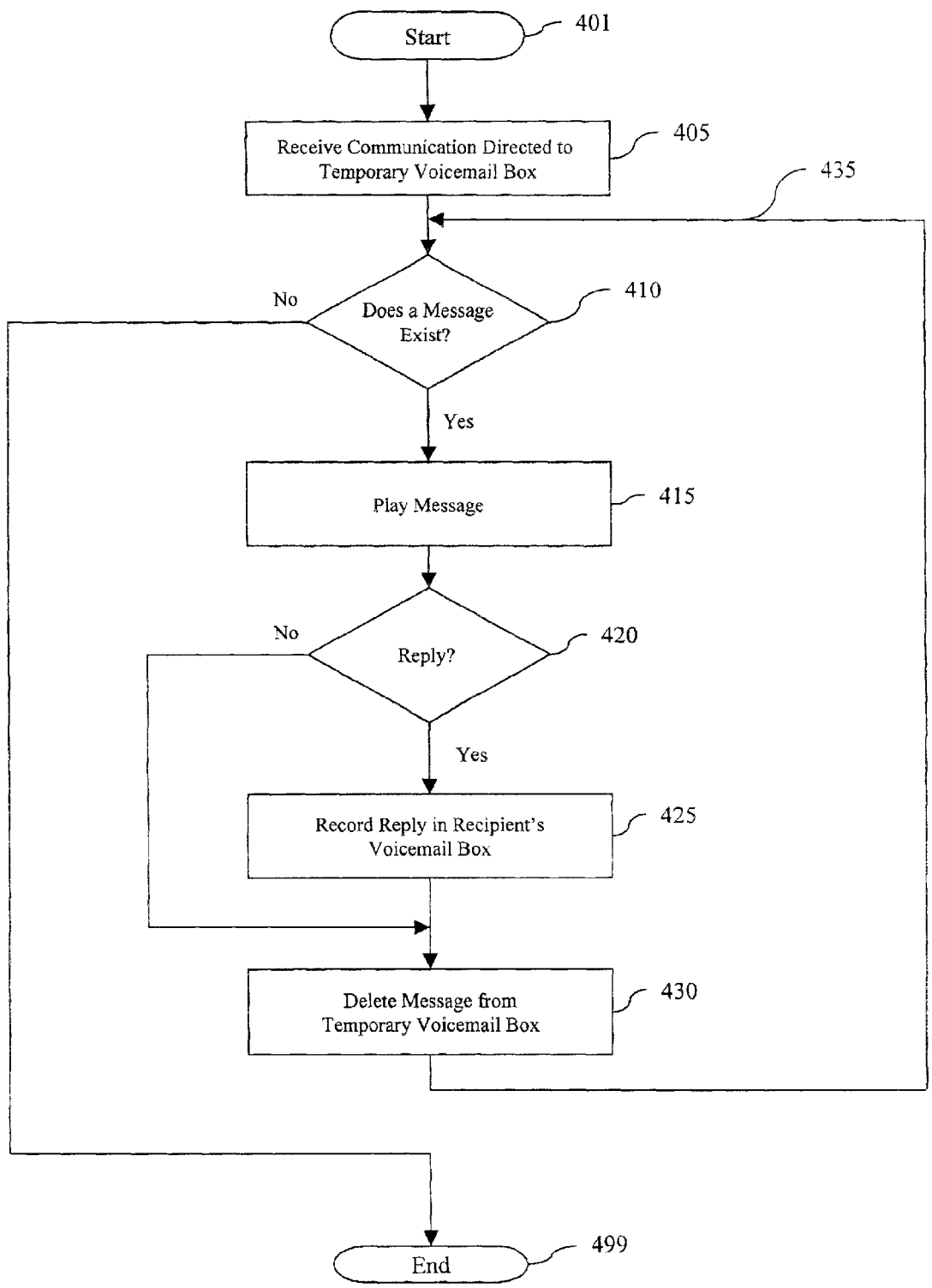
FIG. 4 is a flowchart illustrating an exemplary method for accessing the status notification and reply and for creating an additional reply directed to the original recipient in an embodiment of this invention.

In an embodiment of this invention, at least three discreet processes occur. First, an originator of a message creates a message and indicates a desire for a status certification. Second, the recipient's messaging system creates a temporary voicemail box and maintains the identifiers necessary to provide the status notification. Third, the messaging system stores messages in the temporary voicemail box including a status notification, created in response to a triggering event, and a reply. FIGS. 2, 3 and 4 provide a more detailed illustration of an embodiment of the steps carried out in accordance with this invention.

Referring to FIG. 2, the messaging system receives a message 205. The system provides the originator of the message with the option of enabling status certification of the message 210. The voicemail system provides the option at the conclusion of the recording of the voicemail message. If the caller chooses to forgo status certification, the sender exists the messaging system and the process ends 299. If instead the caller decides to add status certification, the voicemail system creates a temporary voicemail box 215 and provides the caller with a means to later access the voicemail box 220. For example, the means for accessing the certification information may be a uniform resource locator (URL), directing the user to a web-based access interface to the recipient's messaging system. Alternatively, the access means may be a telephone number. The caller specifies message-identifying information, such as a voice annotation 225. At this point, the recipient's messaging system associates an initial set of identifies with the message 230. These identifiers include data about the sender, the recipient, the date and time of the call and any other data regarding the message. Once the system has associated the identifiers with the message, the process is complete 299.

Once a caller has requested certification for a message, the recipient's messaging system associates disposition identifiers with the message whenever a status change occurs. Referring to FIG. 3, the recipient accesses the message 305 that has been certified, and in response, the recipient's messaging system associates an additional disposition identifier with the message 310. The system determines whether the recipient's accessing the message is a triggering event 315. If so, the system compiles the message and disposition identifiers to create a status notification 320 and stores the status notification in the temporary voicemail box 325. The system provides the recipient with the option of replying to the voicemail message 330. If the recipient chooses to reply, the reply is stored in the temporary voicemail box of the original caller 335.

An any point in time, and possibly at many points in time, the original caller may access the temporary voicemail box to ascertain the current status of the message and to determine whether or not the recipient replied to the message. Another caller or, depending on the access means, even an automated system may access the temporary voicemail box to retrieve the status notification and reply. Referring to FIG. 4, the recipient's messaging system receives the communication directed to the temporary voicemail box 405. The system determines whether or not a message exists in the temporary voicemail box 410. If so, the system provides the first message in a form supported by the access means 415. For example, if a caller accesses the temporary voicemail box, the system provides the message in an audio format. The voicemail system prompts for a reply 420. If a reply is received, the voicemail system stores the reply in the voicemail box of the recipient of the original message 425. The system deletes the message from the temporary voicemail box 430. The system repeats the process until not more messages remain in the temporary voicemail box 435. The process ends 499.

Figure 5:
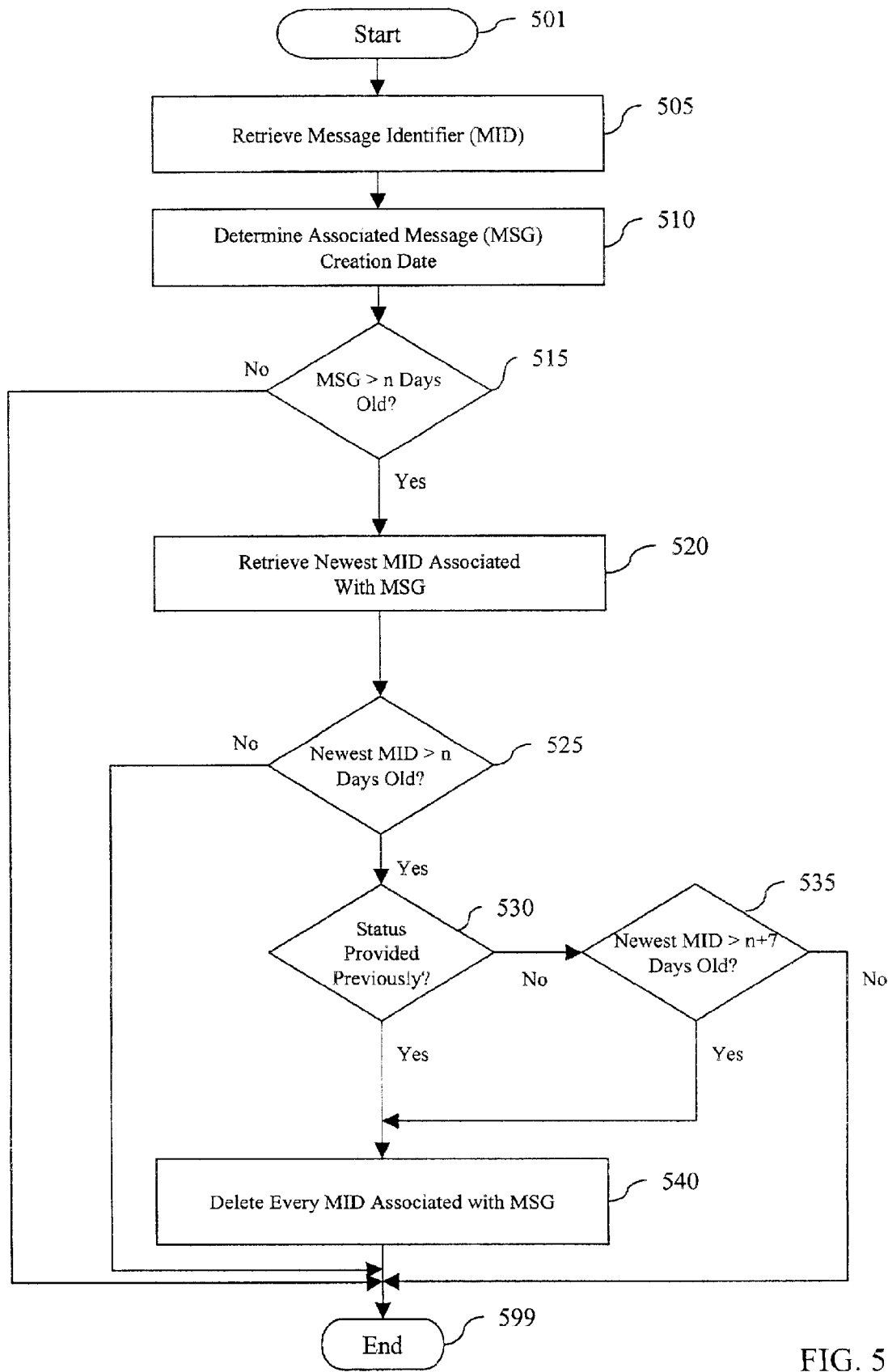
FIG. 5 is a flowchart illustrating an exemplary method for deleting an identifier after the passage of time in an embodiment of this invention.

An embodiment of this invention also provides administrative functionality. To ensure the efficient use of resources, an embodiment of this invention may delete, archive or otherwise transfer or dispose of the identifiers associated with a message. For example, in an embodiment of this invention, a system administrator identifies triggering evens for the deletion of identifiers such as after status notification has been communicated or after the passage of a specified period of time. In one embodiment of this invention an automated process as illustrated in FIG. 5 deletes the identifiers after the passage of time. A system administrator specifies the number of days after which a set of identifiers is stale and can therefore be deleted from the system.

Referring to FIG. 5, the embodiment of the steps of this invention begins with the retrieval a message identifier (MID) 505. Once the MID has been retrieved, the system identifies the message with which the MID is associated 510. By examining the attributes of the message, including the date it was created, the system determines whether the age of the message is greater than a specified number of days (n) 515. The system administrator specifies the value of n prior to the beginning of this process, such as during the configuration of the message system. If the message is greater than n days old the system retrieves the newest MID associated with the message 520; if the message is less than or equal to n days old, the process ends 599. The newest MID is the MID associated with the most recent disposition event related to the message.

The system determines whether the newest MID is greater than n days old 525. If so, the system determines whether or not provision of a status notification has occurred 530. If so, every MID associated with the message is deleted from the system 540. If the system has not provided a status notification, the system next performs at further check to determine whether newest MID is greater than n+7 days old or some other period as defined by the system administrator or user 535. If so, every MID associated with the message is deleted from the system 540. This process is repeated for each remaining MID in the system.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of this invention.

What is claimed is:

1. A method of providing a status certification for a first voicemail message in a telecommunications network, the telecommunications network including a voicemail system, the voicemail system performing a method, comprising:

receiving the first voicemail message and a status certification request at the voicemail system, the first voicemail message generated by a calling party and distributed to a voicemail box assigned to a recipient of the first voicemail message, wherein the recipient is a subscriber to a voicemail service provided by the voicemail system;

assigning a message identifier to said first voicemail message and creating a temporary voicemail box accessible to the calling party, the calling party being a nonsubscriber of the voicemail service associated with a subscriber of a voicemail message system;

in response to detecting an occurrence of a disposition event, creating a disposition identifier in responses to a disposition event;

and associating said disposition identifier with said first voicemail message;

in response to detecting a triggering event, compiling said disposition identifier and said first voicemail message identifier to create a status notification in response to a triggering event, and storing said status notification in the temporary voicemail box accessible to a non-subscriber of said voicemail message system; and providing an access identifier for accessing said temporary voicemail box, wherein an asynchronous dialog is performed between the calling party among users having said access identifier and the recipient via said temporary voicemail box, wherein said asynchronous dialog comprises:

accessing said temporary voicemail box with said access identifier;

receiving a second voicemail message;

associating said second voicemail message with said first voicemail message; and storing said second voicemail message.

2. The method of claim 1, further comprising:

receiving a first reply from the recipient;

associating said first reply with said first voicemail message; and storing said first reply in said temporary voicemail box.

3. The method of claim 2, wherein said asynchronous dialog comprises:

accessing said temporary voicemail box with said access identifier;

receiving a second reply to at least one of said first reply and said first voicemail message;

associating said second reply with said first voicemail message; and storing said second reply.

4. The method of claim 1, further comprising:

billing a party to said first voicemail message for said providing of said status certification.

5. The method of claim 1, wherein said disposition event is initiated by at least one of the recipient, a voicemail system administrator, and an automated event executed by the voicemail system, the disposition event comprising at least one of:

a managing event; and a dispatching event.

6. The method of claim 5, wherein said managing event comprises at least one of:

accessing said first voicemail message;

deleting said first voicemail message;

presenting an indication of said first voicemail message;

expiring said first voicemail message; and terminating a recipient of said first voicemail message from said communications network.

7. The method of claim 5, wherein said managing event comprises at least one of:

denying said status certification of said first voicemail message; and malfunctioning of said status certification of said first voicemail message.

8. The method of claim 5, wherein said dispatching event comprises at least one of:

forwarding said first voicemail message; and replying to said fist voicemail message.

9. The method of claim 1, wherein said first voicemail message identifier comprises at least one of:

a type identifier;

an alphanumeric identifier;

a capabilities identifier; and an annotation.

10. The method of claim 1, wherein said first voicemail message identifier comprises at least one of:

a communication network identifier;

a device identifier;

a role identifier;

a party identifier;

a date identifier; and a time identifier.

11. The method of claim 10, wherein said role identifier comprises at least one of:

an originator;

a sender;

a caller;

a recipient; and a system administrator.

12. The method of claim 10, wherein said party identifier comprises at least one of:

an email address;

an access address;

an access address;

a voice sample; and an image.

13. The method of claim 12, further comprising administrative functionality, wherein said administrative functionality comprises at least one of:

deleting said attribute;

monitoring said attribute;

moving said attribute;

forwarding said attribute;

securing said attribute;

archiving said attribute;

backing up said attribute;

informing a recipient on said attribute; and blocking said attribute.

14. The method of claim 1, further comprising storing in a random access memory an attribute for said status certification for said first voicemail message, wherein said attribute comprises at least one of:

said first voicemail message identifier;

said disposition identifier;

said reply; and said status notification.

15. A method for providing a status certification for a first video mail message in a video-enabled communications network, the video-enabled communications network including a video mail system performing a method, comprising:

receiving the first video mail message and a status certification request at the video mail system, the first video mail message generated by a calling party and distributed to a video mail box assigned to a recipient of the first video mail message, wherein the recipient is a subscriber to a video mail service provided by the video mail system;

assigning a message identifier to said first video mail message and creating a temporary video mail box accessible to the calling party, the calling party being a non-subscriber of the video mail service delivered to a subscriber of a video mail message system;

in response to detecting an occurrence of a disposition event, creating a disposition identifier and in response to a disposition event;

associating said disposition identifier with said first video mail message;

in response to detecting a triggering event, compiling said disposition identifier and said first video mail message identifier to create a status notification and in response to a triggering event;

storing said status notification in then temporary video mail box accessible to a non-subscriber of said voicemail message system;

providing an access identifier for accessing said temporary video mail box, wherein an asynchronous dialog is performed between the calling party among users having said access identifier and the recipient via said temporary video mail box;

wherein the method further comprising;

receiving a reply to the first video mail message;

associating said reply with said first video mail message; and storing said reply in said temporary video mail box.

16. The method of claim 15, further comprising:

billing a party to said first voicevideo mail message for said providing of said status certification.

17. A system for providing a status certification for a first voicemail message dialog in a telecommunications network, the system comprising:

a voicemail system including a processor, the processor performing operative to:

receiving the first voicemail message and status certification request, the first voicemail message generated by a calling party and distributed to a voicemail box assigned to a recipient of the first voicemail message, wherein the recipient is a subscriber to a voicemail service provided by the voicemail system;

assigning a message identifier to said first voicemail message and creating a temporary voicemail box accessible to the calling party, the calling party being a non-subscriber of the voicemail service delivered to a subscriber of a video mail message system;

in response to detecting an occurrence of a disposition event, creating a disposition identifier in response to a disposition event; and associating said disposition identifier with said first voicemail message;

in response to detecting a triggering event, comprising said disposition identifier and said first voicemail message identifier to create said status notification in response to a triggering event, and storing said status notification in the temporary voicemail box accessible to a non-subscriber of said voicemail message system; and providing an access identifier for accessing said temporary voicemail box, wherein an asynchronous dialog is performed between the calling party among users having said access identifier and the recipient via said temporary voicemail box;

wherein said processor, to perform it said asynchronous dialog comprises:

accessing said temporary voicemail box with said access identifier;

receiving a second voicemail message;

associating said second voicemail message with the first message; and storing said second voicemail message.

18. The system of claim 17, said processor further performs operative to:

receiving a first reply from the recipient;

associating said first reply with said first voicemail message; and storing said first reply in said temporary voicemail box.

19. The system of claim 18, wherein said processor, to perform said asynchronous dialog;

accesses said temporary voicemail box with said access identifier;

receives a second reply to at least one of said first voicemail message;

associates said second reply with said first voicemail message; and stores said second reply.

20. The system of claim 17, wherein said processor further performs operative to:

billing a party to said first voicemail message for said providing of said status certification.

21. The system of claim 17, wherein said disposition event is initiated by at least one of the recipient, a voicemail system administrator, and an automated event executed by the voicemail system, the disposition event comprising at least one of:

a managing event; and a dispatching event.

22. The system of claim 21, wherein said managing event comprises at least one of:

accessing said first voicemail message;

deleting said first voicemail message;

presenting an indicationof said first voicemail message;

expiring said first voice message; and terminating a recipient of said first voicemail message from said communications network.

23. The system of claim 21, wherein said managing event comprises at least one of:

denying said status certification of said first voicemail message; and malfunctioning of said status certification of said first voicemail message.

24. The system of claim 21, wherein said dispatching event comprises at least one of:

forwarding said first voicemail message; and replying to said first voicemail message.

25. The system of claim 17, wherein said first voicemail message identifier comprises at least one of:

a type identifier;

an alphanumeric identifier;

a capabilities identifier; and an annotation.

26. The system of claim 17, wherein said first voicemail message identifier comprises at least one of:

a communication network identifier;

a device identifier;

a role identifier;

a party identifier;

a date identifier; and a time identifier.

27. The system of claim 26, wherein said role identifier comprises at least one of:

an originator;

a sender;

a caller;

a recipient; and a system administrator.

28. The system of claim 26, wherein said party identifier comprises at least one of:

an email address;

an access address;

a voice sample; and an image.

29. The system of claim 17, further comprising storing in a random access memory an attribute for said status certification for said first voicemail message, wherein said attribute comprises at least one of:

said first voicemail message identifier said disposition identifier;

said reply; and said status notification.

30. The system of claim 29, further comprising administrative functionality, wherein said administrative functionality comprises at least one of:

deleting said attribute;

monitoring said attribute;

moving said attribute;

forwarding said attribute;

securing said attribute;

archiving said attribute;

backing up said attribute;

informing a recipient of said attribute; and blocking said attribute.

31. The system of claim 30, further comprising a data repository operative to store said attributes.

32. The system of claim 31, wherein said data repository comprises a database.

33. The system of claim 31, wherein said data repository comprises:

a first database for storing said first voicemail message; and a second database for storing said attribute.

34. A system to provide a status certification for a first voicemail message in an advanced intelligence network (AIN), the system comprising:

a voicemail system and an intelligent peripheral, the intelligent peripheral performing operative to:

receiving the first voicemail message and status certification request at the voicemail system, the first voicemail message generated by a calling party and distributed to a voicemail box assigned to a recipient of the first voicemail message, wherein the recipient is a subscriber to a voicemail service provided by the voicemail system;

assigning a message identifier to said first voicemail message and creating a temporary voicemail box accessible to the calling party, the calling party being a non-subscriber of the voicemail service delivered to a subscriber of a voicemail message system;

in response to detecting an occurrence of a disposition event, creating a disposition identifier in response to a disposition event; and associating said disposition identifier with said first voicemail message;

in response to a detecting an occurrence of a triggering event, compiling said disposition identifier and said first voicemail message identifier to create said status notification in response to a triggering event; and storing said status notification in the temporary voicemail box accessible to a non-subscriber of said voicemail message system; and providing an access identifier for accessing said temporary voicemail box, wherein an asynchronous dialog is performed between the calling party among users of said AIN having said access identifier and the recipient of said AIN via said temporary voicemail box, the asynchronous dialog performed by:

wherein said intelligent peripheral, to perform said asynchronous dialog;

accessing said temporary voicemail box with said access identifier;

receiving a second voicemail message;

associating said second voicemail message with said first voicemail message; and storing said second voicemail message.

35. The system of claim 34, wherein said intelligent peripheral is further performs operative to:

receiving a first reply from the recipient;

associating said first reply with said first voicemail message; and storing said first reply in said temporary voicemail box.

36. The system of claim 35, wherein said intelligent peripheral, to perform said asynchronous dialog:

accesses said temporary voicemail box with said access identifier;

receives a second reply to at least one of said first reply and said first voicemail message;

associates said second reply with said first voicemail message; and stores said second reply.

37. The system of claim 34, wherein said intelligent peripheral is further perform separate to:

billing a party to said first voicemail message for said providing of said status certification.

38. The system of claim 34, wherein said triggering event comprises at least one of:

a disposition event; and a passage of time.

39. The system of claim 38, wherein said disposition event is initiated by at least one of the recipient, a voicemail system administrator, and an automated event executed by the voicemail system, the disposition event comprising at least one of:

a managing event; and a dispatching event.

40. The system of claim 39, wherein said managing event comprises at least one of:

accessing said first voicemail message;

deleting said first voicemail message;

presenting an indication of said first voicemail message;

expiring said first voicemail message; and terminating a recipient of said first voicemail message from said AIN.

41. The system of claim 39, wherein said managing event comprises at least one of:

denying said status certification of said first voicemail message; and malfunctioning of said status certification of said first voicemail message.

42. The system of claim 39, wherein said dispatching event comprises at least one of:
   forwarding said first voicemail message; and
   replying to said first voicemail message.

43. The system of claim 34, further comprising:
   a service switching point functionally connected to said intelligent peripheral; and
   an interface functionally connected to a service switching point and operative to accept communications from a second communications network.

44. The system of claim 43, further comprising a mobile telephone switching office (MTSO) functionally connected to said interface and operative to facilitate access to said status notification by a cellular device.

45. The system of claim 43, further comprising a computer network functionally connected to said interface and operative to facilitate access to said status notification by a computer network client device.

46. The system of claim 43, further comprising a personal digital assistant communications network functionally connected to said interface and operative to facilitate access to said status notification by a personal digital assistant.

47. The system of claim 34, wherein said first voicemail message identifier comprises at least one of:
   a type identifier;
   an alphanumeric identifier;
   a capabilities identifier; and
   an annotation.

48. The system of claim 34, wherein said first voicemail message identifier comprises at least one of:
   a communication network identifier;
   a device identifier;
   a role identifier;
   a party identifier;
   a date identifier; and
   a time identifier.

49. The system of claim 48, wherein said role identifier comprises at least one of:
   an originator;
   a sender;
   a caller;
   a recipient; and
   a system administrator.

50. The system of claim 48, wherein said party identifier comprises at least one of:
   an email address;
   an access address;
   a voice sample; and
   an image.

51. The system of claim 34, wherein said intelligent peripheral further performs operative for storing in a random access memory an attribute for said status certification for said first voicemail message, wherein said attribute comprises at least one of:
   said first voicemail message identifier;
   said reply;
   said disposition identifier; and
   said status notification.

52. The system of claim 51, further comprising a service management system functionally connected to said intelligent peripheral, operative to perform administrative functionality comprising at least one of:
   deleting said attribute
   monitoring said attribute;
   moving said attribute;
   forwarding said attribute;
   securing said attribute;
   archiving said attribute;
   backing up said attribute;
   informing a recipient of said attribute; and blocking said attribute.

* * * * *